(12) United States Patent
King

(10) Patent No.: US 10,413,043 B2
(45) Date of Patent: Sep. 17, 2019

(54) EXTENDABLE ARTICULATED STAND ASSEMBLY

(71) Applicant: Lori King, Taylorsville, UT (US)

(72) Inventor: Lori King, Taylorsville, UT (US)

( * ) Notice: Subject to any disclaimer, the term of this patent is extended or adjusted under 35 U.S.C. 154(b) by 0 days.

(21) Appl. No.: 15/865,341

(22) Filed: Jan. 9, 2018

(65) Prior Publication Data

US 2019/0208895 A1 Jul. 11, 2019

(51) Int. Cl.
| | | |
|---|---|---|
| *F16M 11/10* | (2006.01) | |
| *A45D 44/04* | (2006.01) | |
| *F16M 11/20* | (2006.01) | |
| *F16M 11/04* | (2006.01) | |
| *F16M 11/42* | (2006.01) | |
| *F16M 11/28* | (2006.01) | |

(52) U.S. Cl.
CPC .......... *A45D 44/04* (2013.01); *F16M 11/043* (2013.01); *F16M 11/10* (2013.01); *F16M 11/2014* (2013.01); *F16M 11/28* (2013.01); *F16M 11/42* (2013.01)

(58) Field of Classification Search
CPC .. A47B 23/04; A47B 2200/0021–0023; F16M 11/28; F16M 11/043; F16M 11/10; F16M 11/2014; F16M 11/42; A45D 44/04
USPC ...... 248/124.2, 125.8, 125.9, 447, 458, 454, 248/276.1, 278.1, 282.1, 284.1, 121, 248/122.1, 133, 139, 141, 143, 371, 248/415–416, 441.1, 442.2, 445, 457, 248/393–398; 40/493, 602, 608, 607.09, 40/620, 621, 618; 434/419; 108/94
See application file for complete search history.

(56) References Cited

U.S. PATENT DOCUMENTS

| | | | | | |
|---|---|---|---|---|---|
| 571,068 | A | * | 11/1896 | Fillebrown | B23Q 1/621 269/73 |
| 641,683 | A | * | 1/1900 | Evans | A47B 41/02 434/419 |
| 688,200 | A | * | 12/1901 | Schwab | G09F 7/22 40/493 |
| 692,841 | A | * | 2/1902 | Fenton | G09F 7/18 248/346.01 |
| 1,083,764 | A | * | 1/1914 | Smith | A47B 23/007 248/444.1 |
| 1,263,955 | A | * | 4/1918 | Stansbury | F16B 2/246 248/410 |
| 1,453,937 | A | * | 5/1923 | Harrison | A47B 23/04 312/326 |
| 1,602,338 | A | * | 10/1926 | Chittenden | A47B 19/06 248/448 |

(Continued)

*Primary Examiner* — Ingrid M Weinhold

(57) ABSTRACT

An extendable articulated stand assembly for holding eyelash extensions and tools includes a base that is wheeled to allow selective positioning on a surface. A post is coupled to and extends perpendicularly from the base. The post comprises a plurality of nested sections so that the post is selectively extensible. An arm is pivotally coupled to an upper end of the post. The arm comprises a plurality of segments. Each segment is pivotally coupled to adjacent segments so that the arm is selectively positionable relative to the post. A first plate is rotationally coupled to the arm distal from the post. The plurality of segments is configured to allow selective positioning of the first plate relative to the post. Articles that are positioned on the first plate are positionable proximate to a user.

14 Claims, 5 Drawing Sheets

(56) References Cited

U.S. PATENT DOCUMENTS

Figure 1:
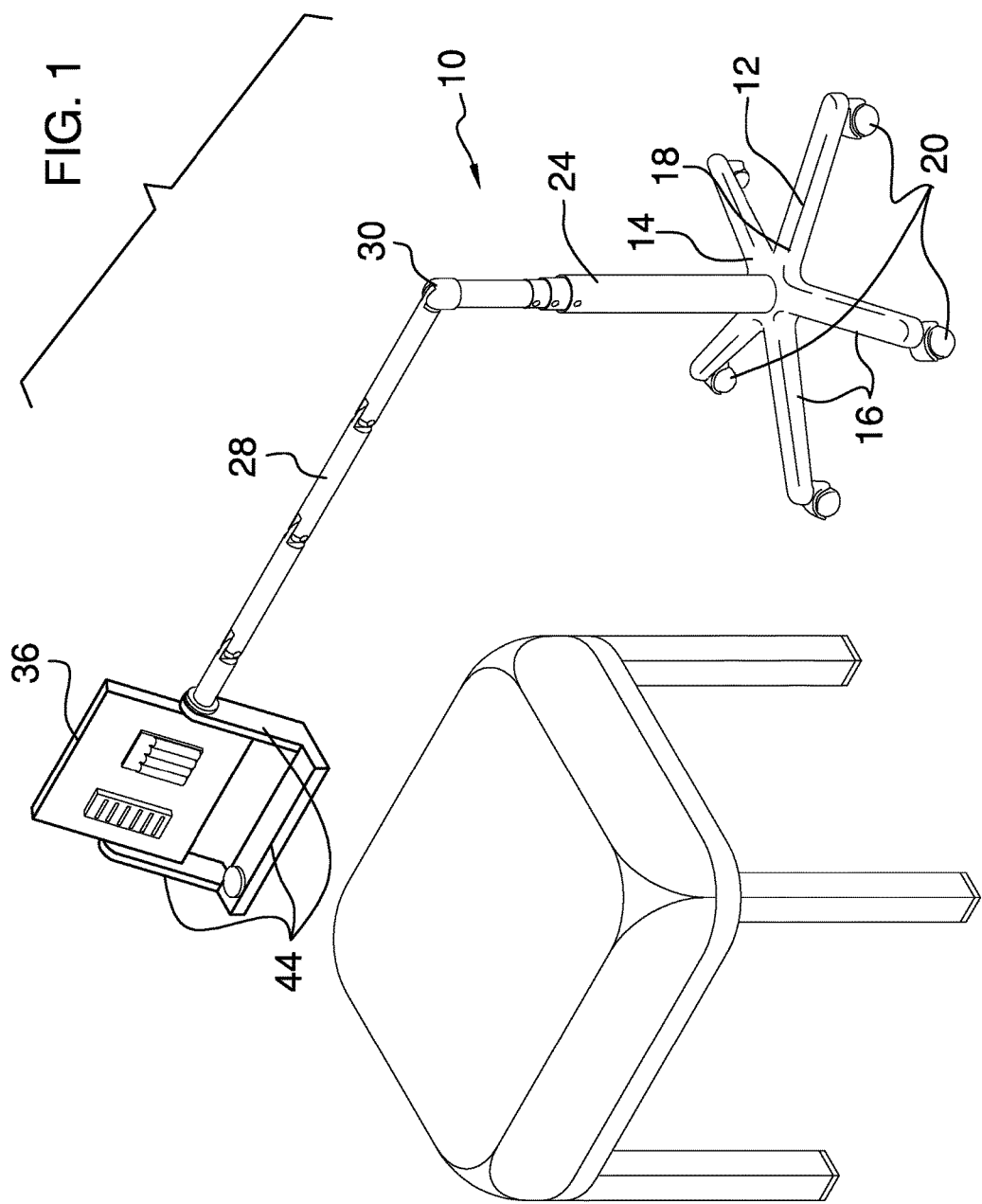

| | | | | |
|---|---|---|---|---|
| 1,654,027 A * | 12/1927 | Westerfors | A47B 23/007 | 248/445 |
| 2,459,873 A * | 1/1949 | Curtis | A47B 23/04 | 248/454 |
| 3,107,442 A * | 10/1963 | Levine | A47B 83/008 | 434/417 |
| 3,148,461 A * | 9/1964 | Johnson | G09B 1/00 | 359/872 |
| 3,333,912 A * | 8/1967 | Kunz | A47B 5/00 | 312/231 |
| 3,336,682 A * | 8/1967 | Genin | B43L 1/008 | 40/618 |
| 3,662,981 A * | 5/1972 | Hogrebe | F16M 11/10 | 248/278.1 |
| 4,183,489 A * | 1/1980 | Copher | F16M 11/10 | 248/278.1 |
| 4,214,393 A * | 7/1980 | Long | G09F 7/20 | 40/613 |
| 4,339,104 A * | 7/1982 | Weidman | F16M 11/10 | 248/407 |
| 4,480,809 A * | 11/1984 | Healey | F16M 11/10 | 248/185.1 |
| 4,596,372 A * | 6/1986 | Ford | A47B 23/04 | 248/157 |
| 4,712,693 A * | 12/1987 | Striplin | F16M 11/10 | 211/164 |
| 4,912,865 A * | 4/1990 | Ellsworth | G09F 7/22 | 40/602 |
| 5,154,391 A * | 10/1992 | Hegarty | B41J 29/15 | 248/205.2 |
| 5,199,680 A * | 4/1993 | Rivera | A47B 23/007 | 248/441.1 |
| D351,527 S * | 10/1994 | Baca | D6/675 | |
| 5,366,070 A * | 11/1994 | Wolov | A45C 11/36 | 206/214 |
| 5,453,915 A * | 9/1995 | Bradley, III | A45D 42/10 | 248/474 |
| 5,471,264 A | 11/1995 | Hsia et al. | | |
| 5,630,566 A * | 5/1997 | Case | A47B 23/046 | 248/122.1 |
| 5,671,900 A * | 9/1997 | Cutler | A47B 23/007 | 248/448 |
| 5,699,631 A * | 12/1997 | Tyson | G09F 7/04 | 40/493 |
| D394,172 S * | 5/1998 | Kubo | D14/451 | |
| 5,979,857 A | 11/1999 | Holm | | |
| D426,985 S * | 6/2000 | Casalino | D6/672 | |
| D451,306 S * | 12/2001 | Dow | D6/675.1 | |
| 6,672,556 B1 | 1/2004 | Hsia | | |
| 7,040,591 B1 | 5/2006 | Simon | | |
| D532,995 S * | 12/2006 | Dorazio | D6/680.1 | |
| D618,009 S * | 6/2010 | Lancet | D6/700 | |
| 7,780,124 B2 * | 8/2010 | Wang | H04N 5/64 | 248/122.1 |
| 8,020,829 B1 * | 9/2011 | Tamayori | F16M 11/14 | 108/144.11 |
| 8,469,204 B1 * | 6/2013 | Bradshaw | F16M 13/00 | 211/26.1 |
| 9,984,600 B1 * | 5/2018 | Daly | G09F 7/22 | |
| 2002/0017595 A1 | 2/2002 | Koyanagi | | |
| 2006/0011790 A1 * | 1/2006 | Lenz | F16M 11/10 | 248/176.3 |
| 2006/0022096 A1 * | 2/2006 | Chan | A47B 23/046 | 248/129 |
| 2007/0012827 A1 * | 1/2007 | Fu | A47B 23/007 | 248/163.1 |
| 2007/0075195 A1 * | 4/2007 | Chen | F16M 11/08 | 248/157 |
| 2016/0219959 A1 | 8/2016 | Chipman et al. | | |
| 2016/0353861 A1 | 12/2016 | Carey | | |

* cited by examiner

EXTENDABLE ARTICULATED STAND ASSEMBLY

The disclosure and prior art relates to stand assemblies and more particularly pertains to a new stand assembly for holding eyelash extensions and tools.

BRIEF SUMMARY OF THE INVENTION

An embodiment of the disclosure meets the needs presented above by generally comprising a base that is wheeled to allow selective positioning on a surface. A post is coupled to and extends perpendicularly from the base. The post comprises a plurality of nested sections so that the post is selectively extensible. An arm is pivotally coupled to an upper end of the post. The arm comprises a plurality of segments. Each segment is pivotally coupled to adjacent segments so that the arm is selectively positionable relative to the post. A first plate is rotationally coupled to the arm distal from the post. The plurality of segments is configured to allow selective positioning of the first plate relative to the post. Articles that are positioned on the first plate are positionable proximate to a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of an extendable articulated stand assembly according to an embodiment of the disclosure.

Figure 2:
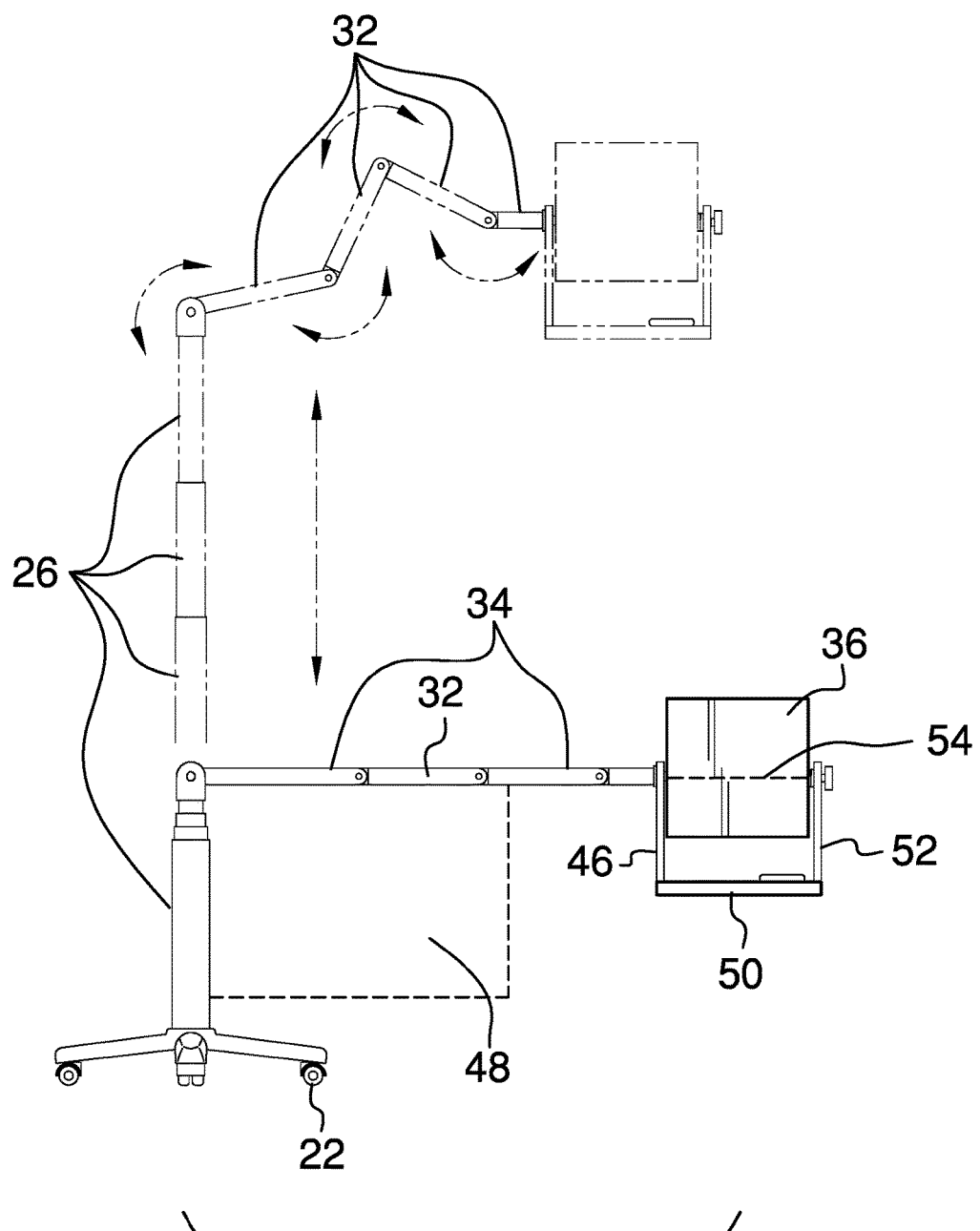
Figure 3:
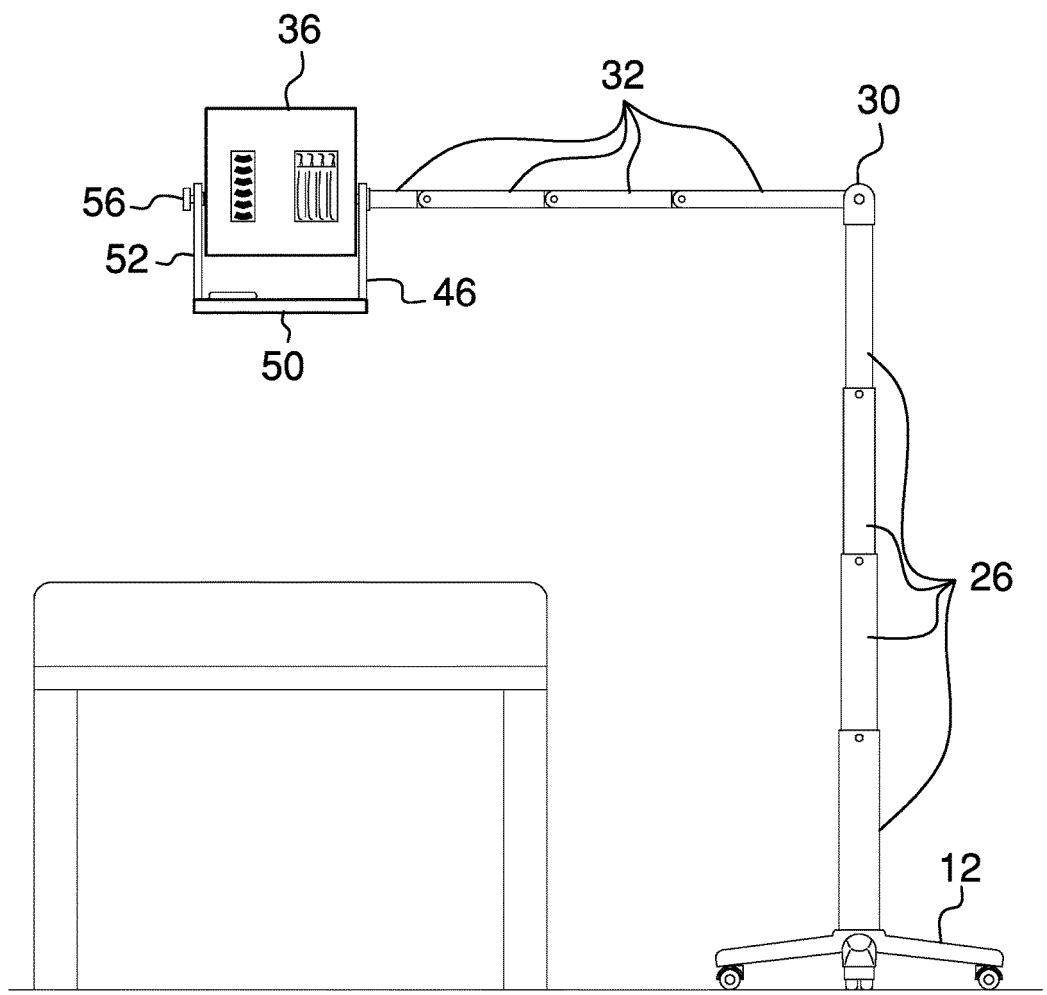
Figure 4:
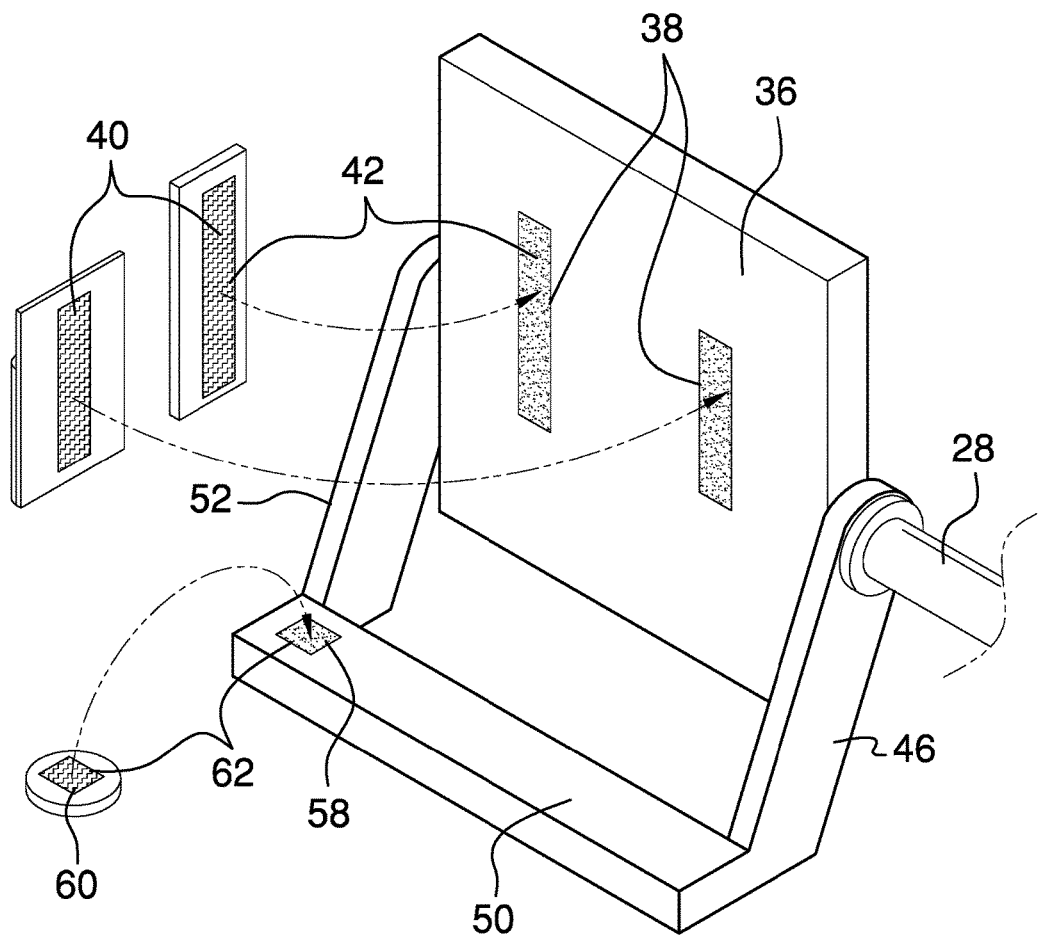
Figure 5:
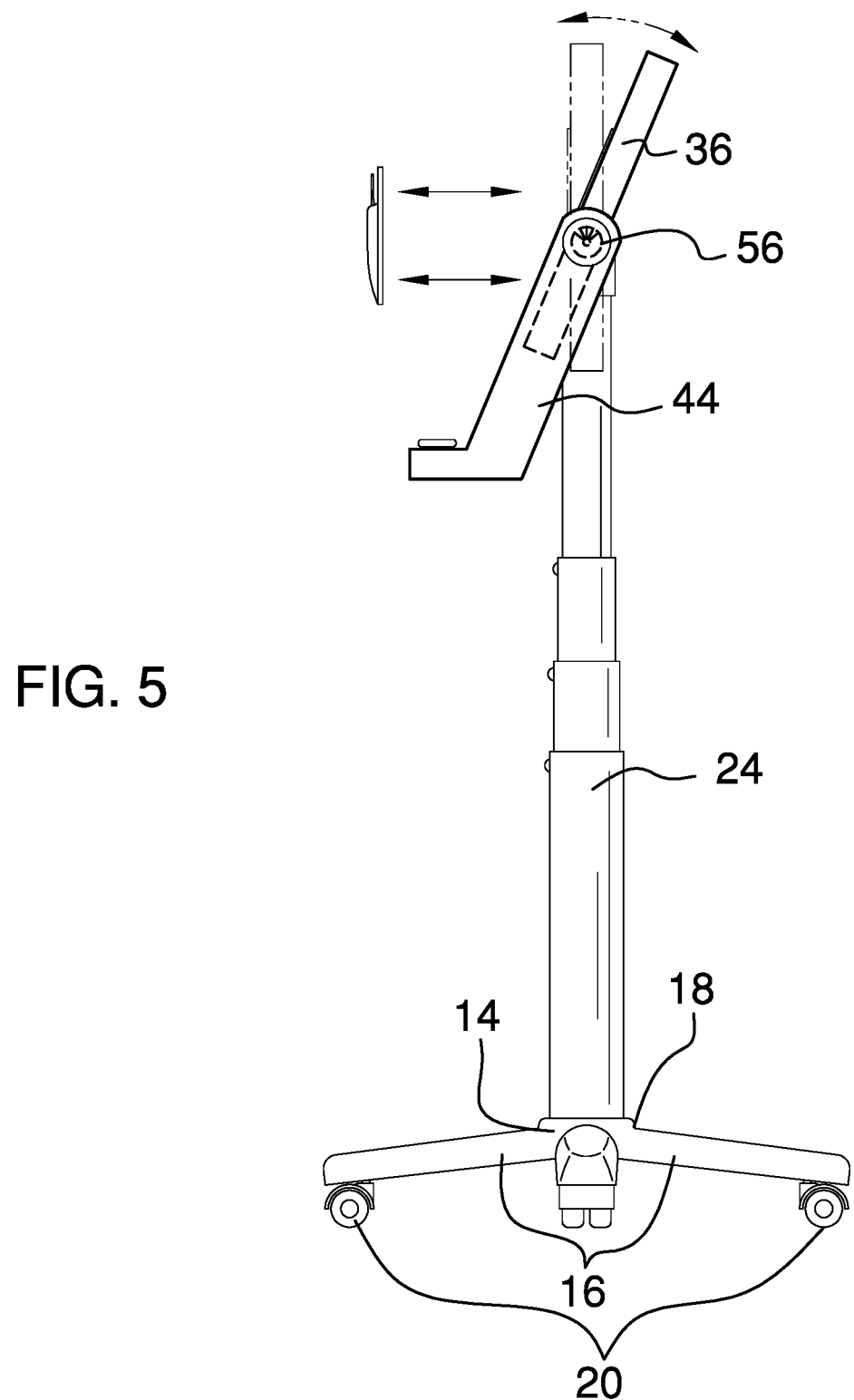

FIG. 2 is a front view of an embodiment of the disclosure.
FIG. 3 is a front view of an embodiment of the disclosure.
FIG. 4 is a detail view of an embodiment of the disclosure.
FIG. 5 is a side view of an embodiment of the disclosure.

DETAILED DESCRIPTION OF THE INVENTION

With reference now to the drawings, and in particular to FIGS. 1 through 5 thereof, a new stand assembly embodying the principles and concepts of an embodiment of the disclosure and generally designated by the reference numeral 10 will be described.

As best illustrated in FIGS. 1 through 5, the extendable articulated stand assembly 10 generally comprises a base 12. The base 12 is wheeled so that the base 12 is configured to selectively position on a surface. The base 12 comprises a disc 14. A plurality of bars 16 is coupled to and extends radially from the disc 14. The plurality of bars 16 comprises five bars 16 that are evenly space around a circumference 18 of the disc 14. Each of a plurality of rollers 20 is coupled to a respective bar 16 distal from the disc 14. The rollers 20 are positioned on the bars 16 so that the base 12 is configured to selectively position on the surface. Each roller 20 comprises a castor 22 or the like.

A post 24 is coupled to and extends perpendicularly from the base 12. The post 24 comprises a plurality of nested sections 26 so that the post 24 is selectively extensible. The post 24 is coupled to the disc 14. The plurality of nested sections 26 comprises four nested sections 26.

An arm 28 is pivotally coupled to an upper end 30 of the post 24. The arm 28 comprises a plurality of segments 32. Each segment 32 is pivotally coupled to adjacent segments 34 so that the arm 28 is selectively positionable relative to the post 24. The plurality of segments 32 comprises four segments 32, as shown in FIG. 2.

A first plate 36 is rotationally coupled to the arm 28 distal from the post 24. The plurality of segments 32 is configured to allow selective positioning of the first plate 36 relative to the post 24. For example, the arm 28 is selectively positionable to position the first plate 36 at a desired position relative to a stool, as shown in FIG. 1, as well as an esthetic bed, massage table, and a recliner. Articles that are positioned on the first plate 36 are positionable proximate to a user.

A plurality of first couplers 38 are coupled to the first plate 36. Each of a plurality of second couplers 40 is configured to couple to a respective article, such as an eyelash extension pallet and a tweezer pouch, as shown in FIG. 1. The second couplers 40 are complementary to the first couplers 38. Each second coupler 40 is positioned to selectively couple to a respective first coupler 38 to couple the respective article to the first plate 36. Each second coupler 40 and the respective first coupler 38 comprise a first hook and loop fastener 42, as shown in FIG. 4.

A bracket 44 is coupled to the arm 28 distal from the post 24. The bracket 44 comprises a first beam 46 that is coupled to and extends from the arm 28. The first beam 46 is transverse to a plane 48 defined by the post 24 and the arm 28. A second plate 50 is coupled to and extends perpendicularly from the first beam 46 distal from the arm 28. A second beam 52 is coupled to and extends perpendicularly from the second plate 50 distal from the first beam 46. The second beam 52 extends codirectionally with the first beam 46. The first beam 46 and the second beam 52 are coplanar.

The first plate 36 is rotationally coupled to and extends between the first beam 46 and the second beam 52. The first beam 46 and the second beam 52 are coupled to the first plate 36 proximate to a midline 54 of the first plate 36. A ratchet hinge 56 is coupled to the second beam 52 distal from the second plate 50. The ratchet hinge 56 is operationally coupled to the first plate 36. The first plate 36 is selectively rotationally positionable relative to the bracket 44 and is fixedly positionable in a desired position, as shown in FIG. 5.

A plurality of third couplers 58 are coupled to the second plate 50. Each of a plurality of fourth couplers 60 is configured to couple to a respective article, such as a jade stone that is used to stage glue for attaching the eyelash extensions, as shown in FIG. 1. The fourth couplers 60 are complementary to the third couplers 58. Each fourth coupler 60 is positioned to selectively couple to a respective third coupler 58 to couple the respective article to the second plate 50. Each fourth coupler 60 and the respective third coupler 58 comprise a second hook and loop fastener 62, as shown in FIG. 4.

In use, the castors 22 that are positioned on the bars 16 allow the base 12 to be selectively positioned on the surface. Each second coupler 40 is positioned to selectively couple to the respective first coupler 38 to couple the respective article to the first plate 36. Each fourth coupler 60 is positioned to selectively couple to the respective third coupler 58 to couple the respective article to the second plate 50. The plurality of nested sections 26 allows the post 24 to be selectively extended. The plurality of segments 32 is configured to selectively position the first plate 36 and the second plate 50 relative to the post 24. The ratchet hinge 56 permits the first plate 36 to be selectively rotationally positioned relative to the bracket 44 and to be fixed in the desired position. The articles that are positioned on the first plate 36 and on the second plate 50 are positioned proximate to the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An extendable articulated stand assembly comprising:
    a base, said base being configured for selectively positioning on a surface;
    a post coupled to and extending perpendicularly from said base, said post comprising a plurality of nested sections such that said post is selectively extensible;
    an arm pivotally coupled to an upper end of said post, said arm comprising a plurality of segments, each said segment being pivotally coupled to adjacent said segments such that said arm is selectively positionable relative to said post;
    a first plate, said first plate being rotatable relative to said arm;
    a bracket coupled to said arm distal from said post, said bracket comprising:
        a first beam coupled to and extending perpendicularly from said arm, said first beam having a front side,
        a second plate, said second plate having a back edge, said back edge of said second plate being coupled to said front side of said first beam wherein said second plate extends forwardly from said front side of said first beam, said second plate extending laterally and perpendicularly away from said first beam in a direction away from said arm, and
        a second beam, said second beam having a front side, said front side of said second beam being coupled to said back edge of said second plate wherein said second plate extends forwardly from said front side of said second beam, said second beam being parallel to said first beam, said front side of said first beam being coplanar with said front side of said second beam; and
    said first plate being rotationally coupled to and extending between said first beam and said second beam;
    wherein said bracket is positioned extending from said arm such that said plurality of segments is configured for selectively positioning said bracket and said first plate relative to said post for positioning articles positioned on said first plate proximate to a user.

2. The assembly of claim 1, further including said plurality of nested sections comprising four said nested sections.

3. The assembly of claim 1, further including said plurality of segments comprising four said segments.

4. The assembly of claim 1, further including said base comprising:
    a disc;
    a plurality of bars coupled to and extending radially from said disc;
    a plurality of rollers, each said roller being coupled to a respective said bar distal from said disc; and
    wherein said rollers are positioned on said bars.

5. The assembly of claim 4, further including each said roller comprising a castor.

6. The assembly of claim 4, further including said plurality of bars comprising five said bars evenly spaced around a circumference of said disc.

7. The assembly of claim 4, further including said post being coupled to said disc.

8. The assembly of claim 1, further comprising:
    a plurality of first couplers coupled to said first plate;
    a plurality of second couplers, each said second coupler being configured for coupling to a respective article, said second couplers being complementary to said first couplers; and
    wherein each said second coupler is configured to be positioned on the respective article such that said second coupler is positioned for selectively coupling to a respective said first coupler whereby said second coupler is configured for coupling the respective article to said first plate.

9. The assembly of claim 8, further including each said second coupler and said respective said first coupler comprising a first hook and loop fastener.

10. The assembly of claim 1, comprising:
    a ratchet hinge coupled to said second beam distal from said second plate, said ratchet hinge being operationally coupled to said first plate; and wherein said ratchet hinge is positioned on said second beam such that said first plate is positioned for selectively rotationally positioning relative to said bracket and for fixedly positioning in a desired position.

11. The assembly of claim 10, further including said first beam and said second beam being coupled to said first plate proximate to a midline of said first plate.

12. The assembly of claim 10, further comprising:
    a plurality of third couplers coupled to said second plate;
    a plurality of fourth couplers, each said fourth coupler being configured for coupling to a respective article, said fourth couplers being complementary to said third couplers; and
    wherein each said fourth coupler is configured to be positioned on the respective article such that each said fourth coupler is positioned for selectively coupling to a respective said third coupler whereby said fourth coupler is configured for coupling the respective article to said second plate.

13. The assembly of claim 12, further including each said fourth coupler and said respective said third coupler comprising a second hook and loop fastener.

14. An extendable articulated stand assembly comprising:
a base, said base comprising:
  a disc,
  a plurality of bars coupled to and extending radially from said disc, said plurality of bars comprising five said bars evenly spaced around a circumference of said disc, and
  a plurality of rollers, each said roller being coupled to a respective said bar distal from said disc, wherein said rollers are positioned on said bars such that said base is configured for selectively positioning on the surface, each said roller comprising a castor;
a post coupled to and extending perpendicularly from said base, said post comprising a plurality of nested sections such that said post is selectively extensible, said post being coupled to said disc, said plurality of nested sections comprising four said nested sections;
an arm pivotally coupled to an upper end of said post, said arm comprising a plurality of segments, each said segment being pivotally coupled to adjacent said segments such that said arm is selectively positionable relative to said post, said plurality of segments comprising four said segments;
a first plate, said first plate being rotatable relative to said arm;
a plurality of first couplers coupled to said first plate;
a plurality of second couplers, each said second coupler being configured for coupling to a respective article, said second couplers being complementary to said first couplers, wherein each said second coupler is configured to be positioned on the respective article such that each said second coupler is positioned for selectively coupling to a respective said first coupler whereby said second coupler is configured for coupling the respective article to said first plate, each said second coupler and said respective said first coupler comprising a first hook and loop fastener;
a bracket coupled to said arm distal from said post, said bracket comprising:
  a first beam coupled to and extending perpendicularly from said arm, said first beam having a front side,
  a second plate, said second plate having a back edge, said back edge of said second plate being coupled to said front side of said first beam wherein said second plate extends forwardly from said front side of said first beam, said second plate extending laterally and perpendicularly away from said first beam in a direction away from said arm, and
  a second beam, said second beam having a front side, said front side of said second beam being coupled to said back edge of said second plate wherein said second plate extends forwardly from said front side of said second beam, said second beam being parallel to said first beam, said front side of said first beam being coplanar with said front side of said second beam,
  said first plate being rotationally coupled to and extending between said first beam and said second beam, said first beam and said second beam being coupled to said first plate proximate to a midline of said first plate, and
  a ratchet hinge coupled to said second beam distal from said second plate, said ratchet hinge being operationally coupled to said first plate, wherein said ratchet hinge is positioned on said second beam such that said first plate is positioned for selectively rotationally positioning relative to said bracket and for fixedly positioning in a desired position;
a plurality of third couplers coupled to said second plate; and
a plurality of fourth couplers, each said fourth coupler being configured for coupling to a respective article, said fourth couplers being complementary to said third couplers, wherein each said fourth coupler is configured to be positioned on the respective article such that each said fourth coupler is positioned for selectively coupling to a respective said third coupler whereby said fourth coupler is configured for coupling the respective article to said second plate, each said fourth coupler and said respective said third coupler comprising a second hook and bop fastener;
wherein said bracket is positioned on said arm such that said plurality of segments is configured for selectively positioning said bracket and said first plate relative to said post for positioning articles positioned on said first and second plates proximate to a user.

* * * * *